(12) United States Patent
Aoki et al.

(10) Patent No.: US 8,496,420 B2
(45) Date of Patent: Jul. 30, 2013

(54) CLIP

(75) Inventors: Ryou Aoki, Kanagawa (JP); Oomi Arisaka, Kanagawa (JP)

(73) Assignee: Piolax Inc., Yokohama-Shi, Kanagawa (JP)

( * ) Notice: Subject to any disclaimer, the term of this patent is extended or adjusted under 35 U.S.C. 154(b) by 526 days.

(21) Appl. No.: 12/801,243

(22) Filed: May 28, 2010

(65) Prior Publication Data

US 2010/0303539 A1    Dec. 2, 2010

(30) Foreign Application Priority Data

May 29, 2009    (JP) .............................. P. 2009-130612

(51) Int. Cl.
*F16B 13/04* (2006.01)

(52) U.S. Cl.
USPC ............... 411/45; 411/54.1; 411/71; 411/553

(58) Field of Classification Search
USPC ................ 411/41, 45, 48, 54.1, 71, 508, 509, 411/549, 553, 913; 24/455; 403/291
See application file for complete search history.

(56) References Cited

U.S. PATENT DOCUMENTS

| | | | | |
|---|---|---|---|---|
| 4,716,633 A * | 1/1988 | Rizo | ........................ | 24/453 |
| 5,028,187 A * | 7/1991 | Sato | ........................ | 411/48 |
| 5,775,860 A * | 7/1998 | Meyer | ........................ | 411/46 |
| 5,934,729 A * | 8/1999 | Baack | ........................ | 296/39.1 |
| 6,074,144 A * | 6/2000 | Meyer | ........................ | 411/41 |
| 6,438,804 B1 * | 8/2002 | Romero Magarino | .......... | 24/289 |
| 6,910,840 B2 * | 6/2005 | Anscher | ........................ | 411/41 |
| 6,932,552 B2 * | 8/2005 | Anscher et al. | ................ | 411/41 |
| 7,018,152 B2 * | 3/2006 | Arisaka | ........................ | 411/41 |
| 7,222,398 B2 * | 5/2007 | Koike | ........................ | 24/297 |
| 7,243,401 B2 * | 7/2007 | Sawatani | ........................ | 24/297 |
| 7,300,089 B2 * | 11/2007 | Kuroda | ........................ | 296/39.1 |
| 7,374,200 B2 * | 5/2008 | Ikeda et al. | ................ | 280/728.2 |
| 2001/0022923 A1 * | 9/2001 | Arisaka | ........................ | 411/45 |
| 2003/0017022 A1 * | 1/2003 | Meyer | ........................ | 411/45 |
| 2008/0193250 A1 * | 8/2008 | Boubtane | ........................ | 411/48 |

FOREIGN PATENT DOCUMENTS

| | | | |
|---|---|---|---|
| JP | 3120355 B2 | 10/2000 | |
| JP | 3120356 B2 | 10/2000 | |

* cited by examiner

*Primary Examiner* — Roberta Delisle
(74) *Attorney, Agent, or Firm* — McGinn IP Law Group, PLLC

(57) ABSTRACT

According to embodiments of the present invention, a clip includes: a plate spring member having a leg portion and flange portions; a pin member having a shaft portion and a head portion. The leg portion has: inclined portions outwardly extending from a bent portion; engagement portions inwardly extending from the inclined portions; and abutting portions connected between the inclined portions and the flange portions. The shaft portion has: a proximal-side diameter-expanded portion; and a distal-side diameter-reduced portion. When the plate spring member is assembled with the pin member and flange portions abut a front side circumference of the mounting hole, the diameter-expanded portion abut the abutting portions to expand the leg portion through a further pushing operation of the pin member thereby engaging the engagement portions with a back side circumference of the mounting hole.

16 Claims, 7 Drawing Sheets

Figure 2:
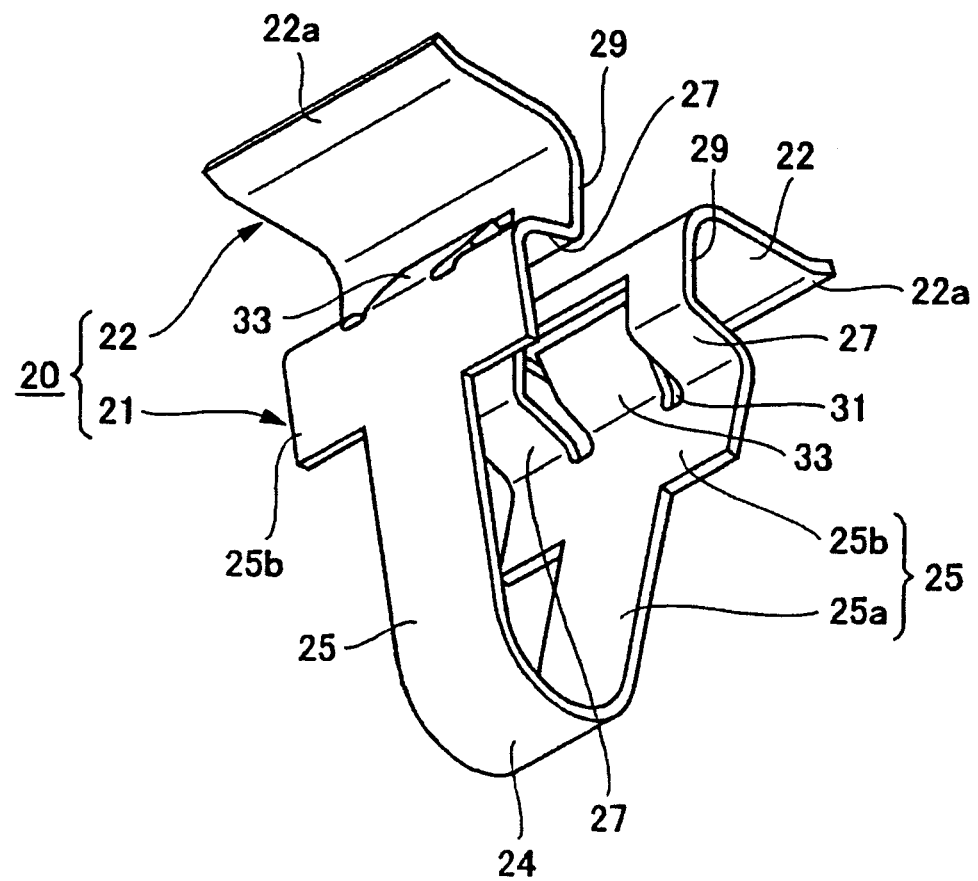

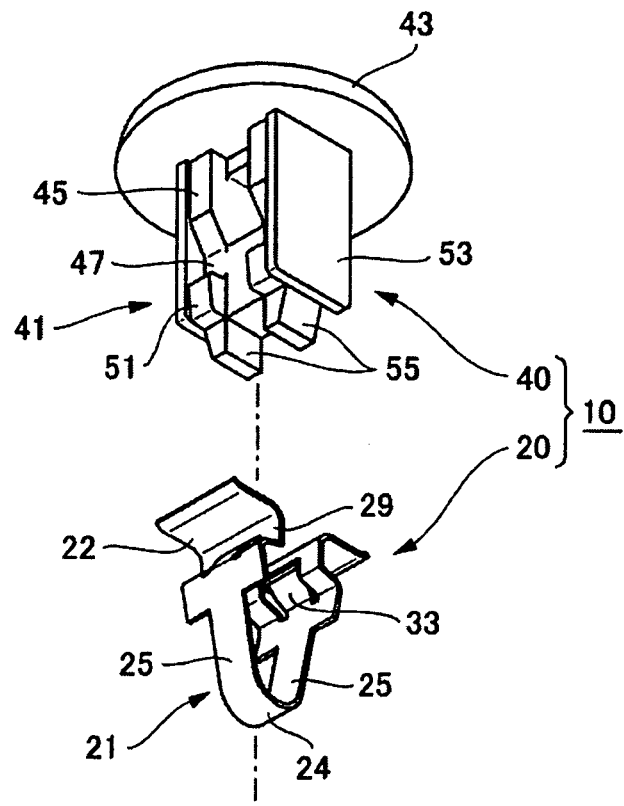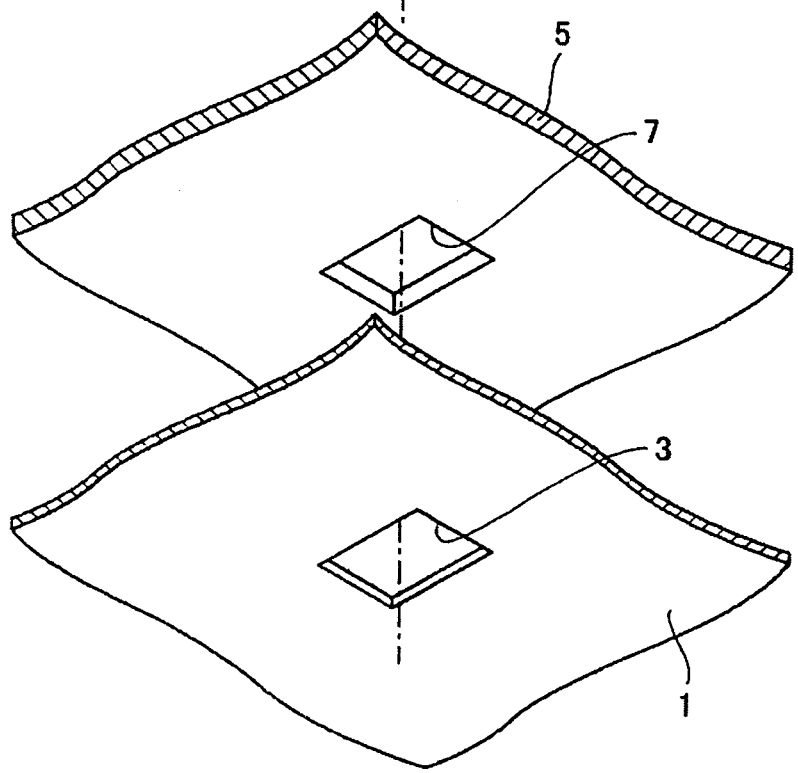
Fig. 1

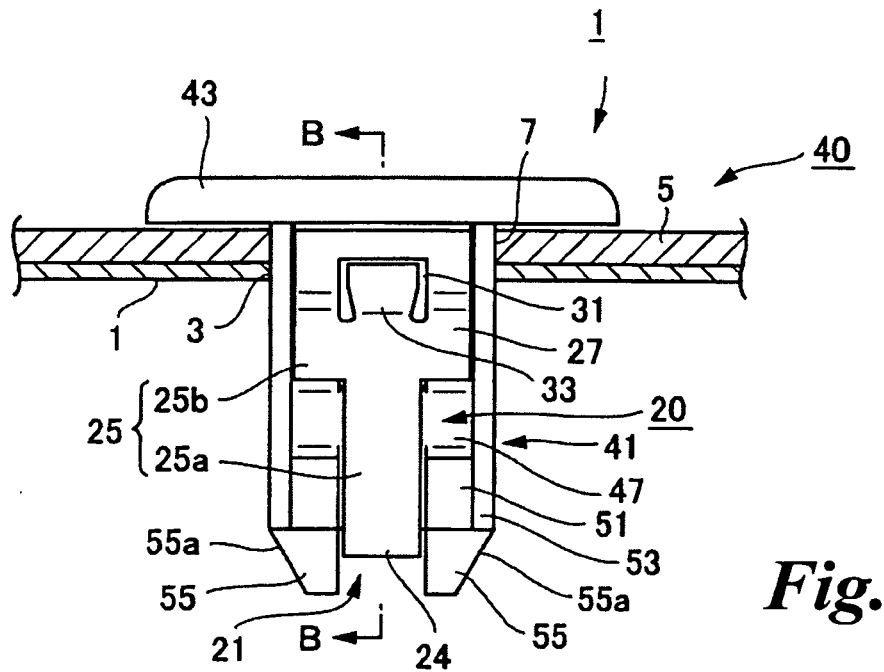
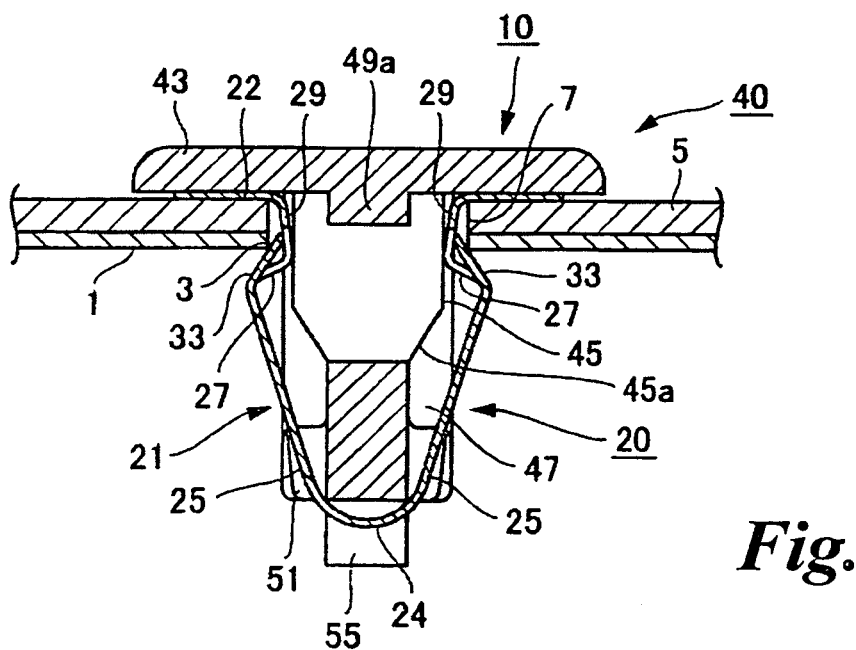

CLIP

CROSS-REFERENCE TO RELATED APPLICATION(S)

This application claims priority from Japanese Patent Application No. 2009-130612 filed on May 29, 2009, the entire contents of which are incorporated herein by reference.

BACKGROUND

1. Field of the Invention

An aspect of the present invention relates to a clip, for example, inserted into a mounting hole formed in a body panel of a vehicle for fixing.

2. Description of the Related Art

A clip is used to mount a mounting-subject member such as a trim board to a mount-base member such as a body panel of a vehicle, for example.

JP-3120355-B discloses a clip composed of a synthetic resin base (hereinafter, referred to as a "base") and a metal spring body (hereinafter, referred to as a "spring body"). The base includes an enlarged head portion and a shaft portion, defines a slit extending from the enlarged head portion to inside the shaft portion and fitted in by the spring body, and is provided with a guide wall having a narrow temporary clipping portion and a wide final clipping portion within the slit of the shaft portion side. The spring body includes a stopper portion larger than a mounting hole, a pair of swelling portions hanging from both ends of the stopper portion and swelling outward, and a pair of curved portions bent back upward and inward from a lower end of respective swelling portions and engaged with the temporary clipping portion and the final clipping portion in a step-like manner.

The curved portion of the spring body is fitted to the temporary clipping portion inside the slit by inserting the spring body from the slit of the base, whereupon the spring body is clipped temporarily with the base. In this state, the clip is inserted into a mounting hole formed in a mount-base member and a mounting hole formed in a mounting-subject member, and the stopper portion of the spring body is engaged with a front side circumference of the mounting hole of the mounting-subject member. After that, the enlarged head portion of the base is pushed in, whereupon the pair of curved portions of the spring body abut against the wide final clipping portion of the base, and the pair of swelling portions of the spring body are swollen outward. The pair of swelling portions are engaged with a back side circumference of the mounting hole of the mount-base member, whereby the mounting-subject member is mounted to the mount-base member via the clip.

JP-3120356-B discloses a fastener composed of a synthetic resin pin and a metal clip. The pin includes a head flange and a shaft portion, and the shaft portion includes a diameter-expanded portion and a diameter-reduced portion. The clip includes a pressing portion formed with a through-hole for inserting the pin in the center and a pair of leg portions. The fastener further includes spring portions formed by outwardly folding back distal ends of the leg portions to be engaged with the back side circumference of the mounting hole.

The shaft portion of the pin is inserted from the through-hole of the clip, and the distal end of the leg portion of the clip is engaged with the diameter-reduced portion of the pin, whereby the clip is temporarily clipped to the pin. In this state, the fastener is inserted into a mounting hole of a mount-base member and a mounting hole of a mounting-subject member, and the pressing portion of the clip is engaged with the front side circumference of the mounting hole of the mounting-subject member. When the pin is further pushed in, the pair of leg portions are expanded by the diameter-expanded portion, the spring portions formed by being folded back outside the leg portions are engaged with the back side circumference of the mounting hole of the mount-base member, whereby the mounting-subject member is mounted to the mount-base member via the fastener.

In the clip of JP-3120355-B, a slit is required at the shaft portion and enlarged head portion of the base in order to assemble the spring body with the base, and thus, the structure of the base is complicated. Further, in a final fixing state where the mounting-subject member is fixed with the mount-base member, the pair of curved portions abut against the final clipping portion of the base, whereby deformation of the pair of swelling portions having been engaged with the back side circumference of the mounting hole is restricted. As a result, since an expanding amount at the stopper portion side of the spring body is insufficient, it is not suitably applicable to the mount-base member having thin plate thickness, and backlash may arise in some cases.

In the fastener of JP-3120356-B, a through-hole for inserting the pin is required in the center of the pressing portion of the clip. Further, since the spring portion engaged with the back side of the mounting hole is formed by folding back each side of the clip outside, the structure of the clip is complicated, and there is a problem in terms of productivity.

SUMMARY

One of objects of the present invention is to provide a clip capable of being simply formed and being tightly engaged with a mounting hole regardless of a plate thickness of the mounting subject in which the mounting hole is formed.

According to embodiments of the present invention, a clip includes: a plate spring member having: a leg portion bent in a V-shape; and flange portions outwardly extending from both ends of the leg portion; a pin member having: a shaft portion formed to be inserted inside the plate spring member; and a head portion formed at a proximal end of the shaft portion, wherein the leg portion of the plate spring member has: a vent portion; inclined portions obliquely outwardly extending from both ends of the bent portion; engagement portions inwardly extending from distal ends of the inclined portions; and abutting portions to be abutted against the shaft portion of the pin member, the abutting portions being connected between the distal ends of the inclined portions and proximal ends of the flange portions; and wherein the shaft portion of the pin member has: a diameter-expanded portion provided at a proximal end side of the pin member adjacent to the head portion; and a diameter-reduced portion provided at a distal end side of the pin member as compared with the diameter-expanded portion, wherein the leg portion is insertable into a mounting hole formed in a mounting subject, in a state where the plate spring member is assembled with the pin member so that the abutting portions abut against the diameter-reduced portion, and wherein, in a state where the flange portions of the plate spring member abut against a front side circumference of the mounting hole, the diameter-expanded portion of the shaft portion is caused to abut against the abutting portions to expand the leg portion in accordance with a further pushing operation of the pin member so that the engagement portions are engaged with a back side circumference of the mounting hole.

The engagement portion may be defined via a slit and formed so as to be flexible.

A U-shaped slit having a pair of slits extending in a longitudinal direction of the plate spring member and a slit joining ends of the pair of slits at a side of the flange portion may be formed as the slit to define a tongue piece, and the engagement portion may be formed by outwardly raising the tongue piece.

A pair of slits extending in a longitudinal direction of the plate spring member may be formed as the slit to define a strip piece, and the engagement portion may be formed by outwardly raising the strip piece.

The leg portion may be formed narrowly at a side of the bent portion and formed widely at a side of the flange portions, and the engagement portions may be formed at portions of the leg portion formed widely.

Concave portions may be formed on the diameter-expanded portion of the pin member so as to allow the engagement portions of the plate spring member to inwardly deform.

Pressing ribs may be formed at the shaft portion of the pin member so that the pressing ribs are positioned at both sides of the leg portion of the plate spring member when the plate spring member is assembled with the pin member.

A drop-off prevention protrusion may be formed at the diameter-reduced portion of the shaft portion so that the drop-off prevention protrusion of the pin member is positioned at the distal end side as compared with the abutting portions of the plate spring member when the abutting portions abut against the diameter-reduced portion.

Guide protrusions may be formed at a distal end of the shaft portion so that the bent portion is entered therebetween when the diameter-expanded portion of the pin member is caused to abut against the abutting portions of the plate spring member, and outer-side surfaces of the guide protrusions may be tapered to be gradually reduced in diameter toward the distal end side.

According to the above-described configuration, the shaft portion of the pin member is inserted inside the plate spring member, the leg portion of the plate spring member is inserted into a mounting hole of the mounting subject in a state where the abutting portions of the plate spring member abut against the diameter-reduced portion of the pin member, and the pin member is further pushed in a state where the flange portions abut against the front side circumference of the mounting hole of the mounting subject, whereby the diameter-expanded portion abuts against the abutting portions to expand the leg portion, the engagement portions are engaged with the back side circumference of the mounting hole, and the clip can be fixed with the mounting hole.

As described above, since the plate spring member includes a leg portion bent in a V-shape to hold the shaft portion of the pin member, the plate spring member is retained with the pin member. And, it is not necessary to provide a plate spring member fitting-in slit at the pin member (synthetic resin base) as in JP-3120355-B or provide a pin member inserting through-hole at the plate spring member (clip) as in JP-3120356-B, and the pin member and the plate spring member can be made relatively simple in structure.

Further, the abutting portions provided between the distal ends of the inclined portions of the V-shaped leg portion and the flange portions abut against the diameter-expanded portion of the shaft portion to expand the V-shaped leg portion. Since the engagement portions extending from the distal ends of the inclined portions are sufficiently expanded, even when a thickness of the mounting subject having the mounting hole is thin, the clip with can be tightly fixed with the mounting hole without backlash regardless of the thickness.

DRAWINGS

Figure 3:
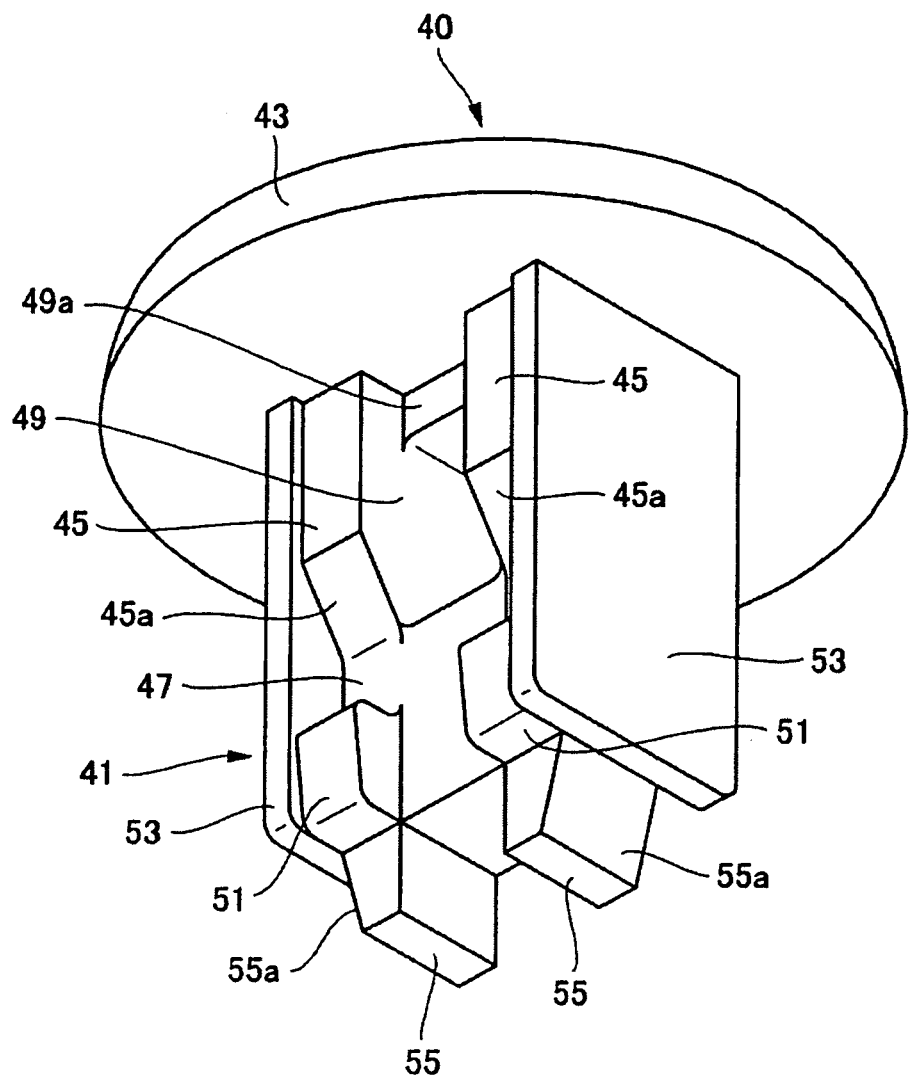
Figure 4A:
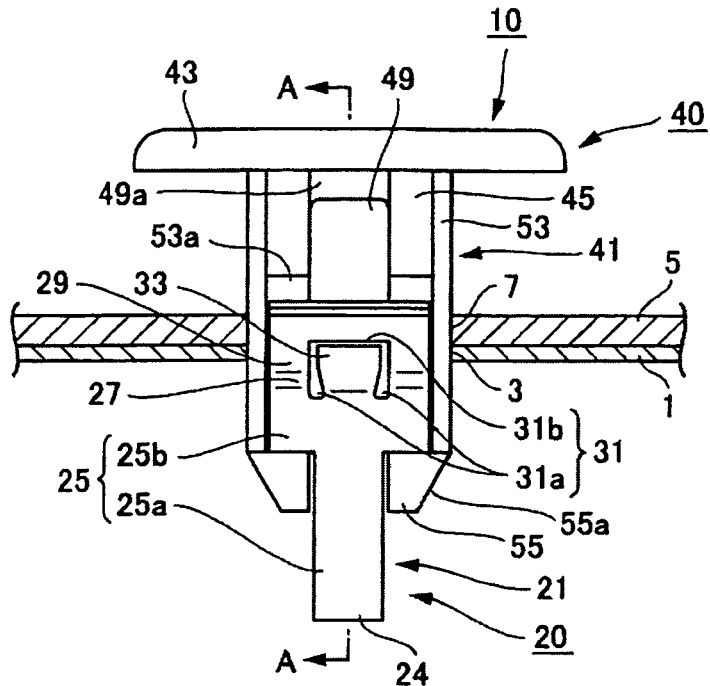
Figure 4B:
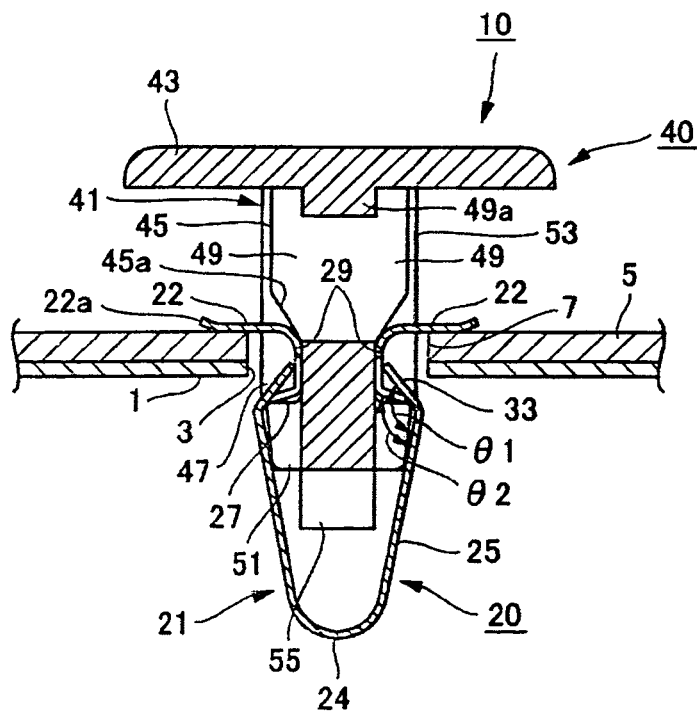
Figure 6:
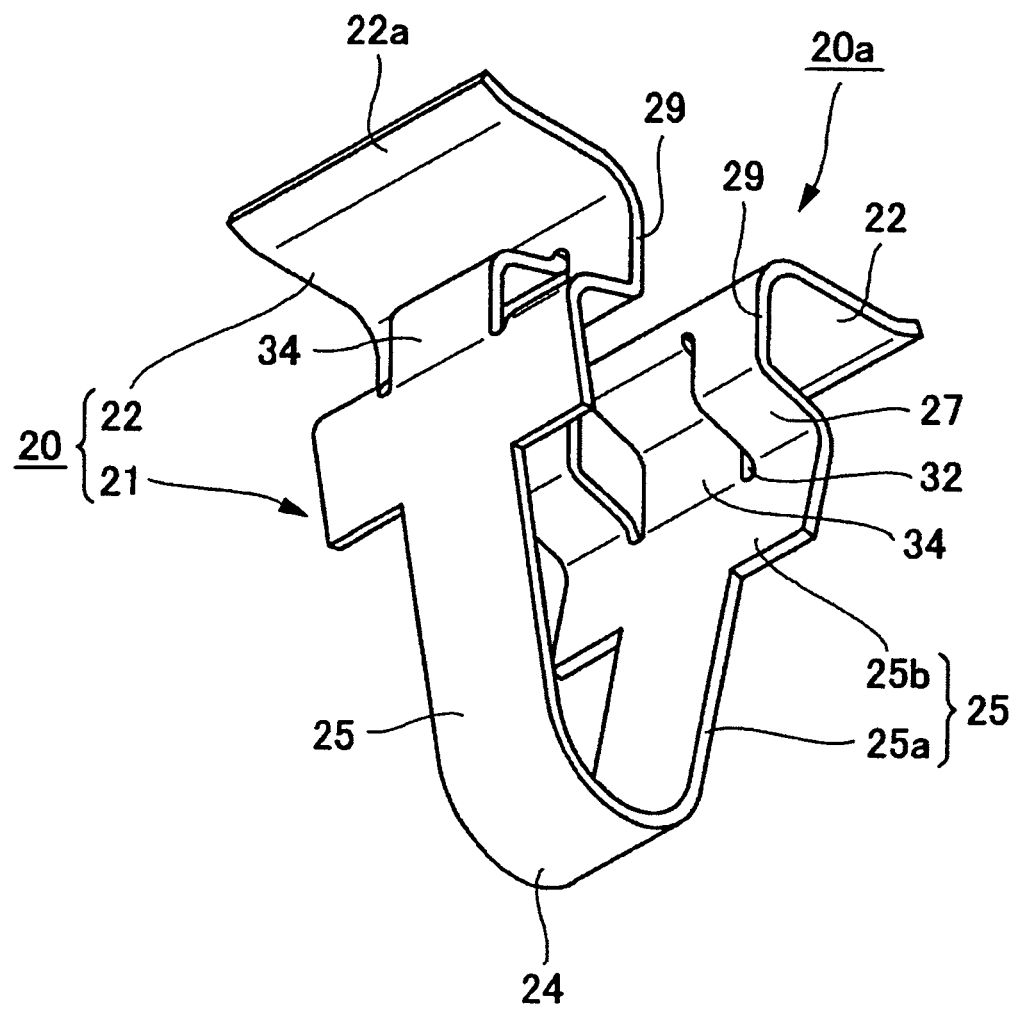
Figure 7A:
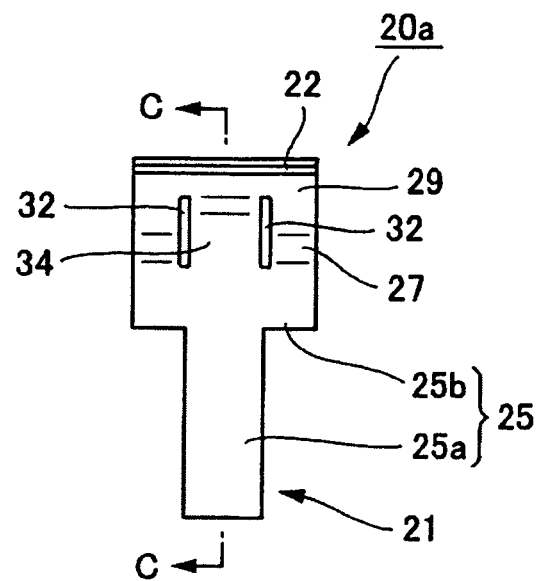
Figure 7B:
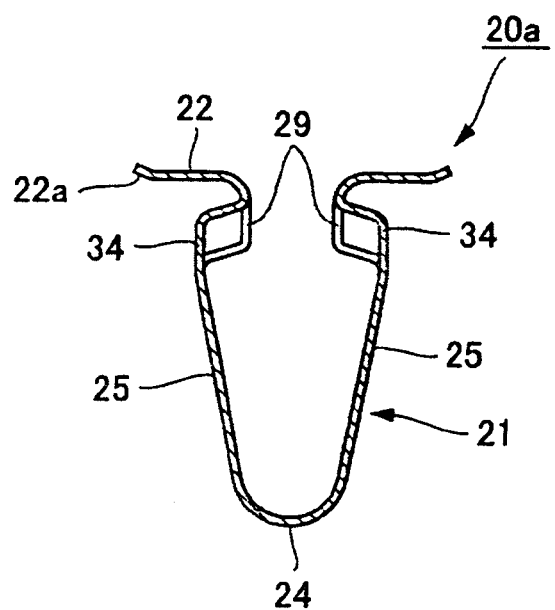

FIG. 1 illustrates a clip according to an embodiment.
FIG. 2 illustrates a plate spring member of the clip.
FIG. 3 illustrates a pin member of the clip.
FIGS. 4A and 4B illustrate a state in which the clip is inserted into a mounting hole, FIG. 4A being an explanatory diagram, FIG. 4B being a sectional view taken along arrow A-A in FIG. 4A.
FIGS. 5A and 5B illustrate a state in which the clip is fixed with the mounting hole, FIG. 5A being an explanatory diagram, FIG. 5B being a sectional view taken along arrow B-B in FIG. 5A.
FIG. 6 illustrates a clip according to another embodiment.
FIGS. 7A and 7B illustrate a plate spring member of the clip, FIG. 7A being a front view, FIG. 7B being a sectional view taken along arrow C-C in FIG. 7A.

DETAILED DESCRIPTION

Hereinafter, embodiments of the present invention will be described with reference to FIGS. 1 to 5B.

As shown in FIG. 5B, for example, a clip 10 according to an embodiment is inserted into and fixed with a mounting hole 3 formed in a mount-base member 1 such as a body panel. For example, a mounting-subject member 5 such as a trim board, a panel member, a garnish, a cover, an assist grip is mounted to the mount-base member 1 through the clip 10.

As shown in FIG. 1, the clip 10 includes a plate spring member 20 and a pin member 40 assembled with the plate spring member 20.

First, the plate spring member 20 will be described with reference to FIG. 2 and FIGS. 4A and 4B. The plate spring member 20 is formed from a metal plate. The plate spring member 20 includes a leg portion 21 and flange portions 22. The leg portion 21 is bent into a V-shape so as to sandwich the shaft portion of the pin member 40 as described later, and the flange portions 22 outwardly extend from both ends of the leg portion 21. The flange portions 22 are to be engaged with a front side circumference of a mounting hole 7 (see FIG. 4B) formed in a mounting-subject member 5.

The V-shaped leg portion 21 includes an arc-shaped bent portion 24 and inclined portions 25, 25. The inclined portions 25, 25 obliquely outwardly extend from both ends of the bent portion 24 to move away from each other. Each inclined portion 25 has the same plate thickness as the bent portion 24. And, each inclined portion 25 includes a narrow portion 25a at the bent portion 24 side, and a wide portion 25b formed more widely than the narrow portion 25a at the flange portion 22 side.

The leg portion 21 further includes shoulder portions 27 and abutting portions 29. The shoulder portions 27 are bent inward (with respect to the leg portion 21) from distal ends of the wide portions 25b of the inclined portions 25. And, the abutting portions 29 are bent outward (with respect to the leg portion 21) from distal ends of the shoulder portions 27 to extend in parallel with each other. The abutting portions 29 are to be abutted with the shaft portion 41 of the pin member 40 as described later. The flange portion 22 outwardly extends from each distal end of the abutting portions 29 to form a substantially right angle. The abutting portion 29 is positioned between the inclined portion 25 and the flange portion 22. Further, the flange portion 22 includes an outer end portion 22a obliquely outwardly bent to be away from the leg portion 21.

The plate spring member 20 further includes an engagement portion 33 bent and extended inside from the distal end of the inclined portion 25 to be engaged with the back side circumference of the mounting hole 3 (see FIG. 5B) of the mount-base member 1. In this embodiment, the engagement portion 33 is cut via a slit 31 to be flexibly raised at the wide portion 25b of the leg portion 21.

As shown in FIG. 4A, in the embodiment, the slit 31 includes a pair of vertical slits 31a and a horizontal slit 31b. The vertical slits 31a extend in parallel with each other along the wide portion 25b, the shoulder portion 27 and the abutting portion 29 in the longitudinal direction of the plate spring member 20, while the horizontal slit 31b connects ends of the vertical slits 31a at the flange portion 22 side in a direction perpendicular to the vertical slits 31a, thereby forming a U-shape as a whole. The U-shaped slit 31 defines a tongue piece thereinside, and the tongue piece is outwardly raised to form the engagement portion 33 having a proximal end coupled to a width-direction center of the wide portion 25b and a distal end functioning as a free end. Therefore, the engagement portion 33 is flexible and deformable.

As show in FIG. 4B, the engagement portion 33 is outwardly bent more than the shoulder portion 27 so that an angle θ1 between the engagement portion 33 and the leg portion 21 is larger than an angle θ2 between the shoulder portion 27 and the leg portion 21. Further, a distal end portion of the engagement portion 33 is arranged outside more than the abutting portion 29.

As shown in FIG. 4A, a width of the engagement portion 33 is gradually widened from the leg portion 21 side (the inclined portion 25 side) to the flange portion 22 side. Therefore, the engagement portion 33 is made flexible while maximally providing an engageable area relative to the back side circumference of the mounting hole.

Next, the pin member 40 will be described with reference to FIG. 3 and FIGS. 4A and 4B. The pin member 40 includes a shaft portion 41 to be inserted inside the plate spring member 20 and a disc-shaped head portion 43 formed at a proximal end the shaft portion 41.

The shaft portion 41 is formed into a column shape having a substantially rectangular cross section. In the shaft portion 41, two opposed surfaces (opposed wide surfaces) are formed wider than the other two opposed surfaces (opposed narrow surfaces), for example. On the shaft portion 41, a diameter-expanded portion 45 is provided at the proximal end side adjacent to the head portion 43, and a diameter-reduced portion 47 is provided at the distal end side as compared with the diameter-expanded portion 45. The diameter-expanded portion 45 and the diameter-reduced portion 47 are expanded or reduced in a diameter at both of the opposed wide surfaces. The plate spring member 20 is assembled to the pin member 40 in such a manner that the V-shaped leg portion 21 is arranged at the opposed wide surfaces of the shaft portion 41 so as to sandwich the shaft portion 41 therebetween.

Although the both of the opposed wide surfaces of the shaft portion 41 are expanded/reduced in the diameter in this embodiment, only one surface may be expanded/reduced in the diameter.

A thickness of the diameter-expanded portion 45 of the pin member 40 is greater than a distance between the pair of abutting portions 29 of the plate spring member 20. When the pin member 40 is deeply pushed into the plate spring member 20, the diameter-expanded portion 45 abuts against the pair of abutting portions 29 to expand the leg portion 21 (see FIG. 5B). Since, a tapered portion 45a is formed at the distal end side of the diameter-expanded portion 45 to be gradually lowered in height toward the distal end, the pin member 40 is easily pushed into the plate spring member 20 from a state where the abutting portions 29 abut against the diameter-reduced portion 47.

On each of the opposed wide surfaces where the diameter-expanded portion 45 is formed, a concave portion 49 is formed at a width-direction center thereof. The concave portions 49 are formed at positions corresponding to the engagement portion 33 of the plate spring member 20, and allow an inward deformation of the engagement portions 33. In this embodiment, the two concave portions 49 at both of the opposed wide surfaces are communicated with each other to form one through-hole, for example. Inside the through hole formed by the concave portions 49, a reinforcing convex portion 49a is provided at the head portion 43 side. While the diameter-expanded portion 45 is subjected to lightening by the through-hole, rigidity thereof is improved by the reinforcing convex portion 49a.

The two concave portions 49 may not be communicated with each other, and may be partitioned by a wall formed therebetween, for example.

The diameter-reduced portion 47 is formed at the distal end side as compared with the diameter-expanded portion 45, and is reduced in diameter as compared with the diameter-expanded portion 45. And, the diameter-reduced portion 47 is configured to have a thickness almost matching with the distance between the abutting portions 29 of the plate spring member 20. Therefore, when the pin member 40 is pushed into the plate spring member 20 so that the abutting portions 29 abut against the diameter-reduced portion 47, the leg portion 21 of the plate spring member 20 can be maintained in a diameter-reduced state.

A drop-off prevention protrusion 51 is formed on the shaft portion 41 at the distal end side as compared with the diameter-reduced portion 47. When the abutting portions 29 abut against the diameter-reduced portion 47, the drop-off prevention protrusion 51 is positioned nearer to the distal end of the shaft portion 41 as compared with the abutting portions 29. In this embodiment, four drop-off prevention protrusions 51 are formed on the diameter-reduced portion 47 at the width-direction both sides of the opposed wide surfaces, respectively, one-by-one.

An outer corner portion of the drop-off prevention protrusion 51 at the distal end side of the pin member 40 may be chamfered, or tapered to be gradually lowered in height toward the distal end side of the pin member 40. According to the above configuration, when the plate spring member 20 is assembled with the pin member 40 by inserting the shaft portion 41 into the leg portion 21, the leg portion 21 can be gradually expanded without manually expanding the leg portion 21 before assemble, thereby improving assembling workability.

On the opposed narrow surfaces of the shaft portion 41, plate-like pressing ribs 53 are provided. When the plate spring member 20 is assembled to the pin member 40, the pressing ribs 53 are positioned at both sides of the leg portion 21.

Two guide protrusions 55 are protruded from the distal end surface of the shaft portion 41 at both sides corresponding to the opposed narrow surfaces. When the pin member 40 is pushed into the plate spring member 20 until the diameter-expanded portion 45 abuts against the abutting portion 29, the bent portion 24 is entered between inner-side surfaces of the guide protrusions 55 (see FIGS. 5A and 5B). Outer-side surfaces of guide protrusion 55 are tapered toward the distal end of the shaft portion 41 to respectively form a tapered surface 55a.

In the clip 10 according to this embodiment, the plate spring member 20 is assembled to the pin member 40 so that the abutting portions 29 abut against the diameter-reduced portion 47, and then the leg portion 21 is inserted into the mounting holes 3, 7 so that the flange portions 22 abut against the front side circumference of the mounting hole 7 (FIGS. 4A and 4B). Then, the shaft portion 41 is further pushed, whereby the diameter-expanded portion 45 abuts against the abutting portion 29 to expand the leg portion 21, and the engagement portion 33 is engaged with the back side circumference of the mounting hole 3 (FIGS. 5A and 5B).

Next, a method for using the above-configured clip 10 will be described. In this embodiment, the mounting-subject member 5 and the mount-base member 1 are functioning as a mounting subject.

First, to assemble the plate spring member 20 to the pin member 40, the leg portion 21 is arranged at both sides of the shaft portion 41. Then, the shaft portion 41 is inserted into the leg portion 21 while outwardly expanding the leg portion 21 against an elastic biasing force thereof until both abutting portions 29 abut the diameter-reduced portion 47. In this state, the expansion of the leg portion 21 is stopped, and the leg portion 21 is elastically restored (inwardly deformed). As a result, the planar-shaped abutting portions 29 abut the diameter-reduced portion 47 to be fitted in between the tapered portion 45a and the drop-off prevention protrusions 51, whereby the plate spring member 20 is assembled to the pin member 40 as shown in FIGS. 4A and 4B.

In this embodiment, the pressing ribs 53 are positioned at both sides of the leg portion 21 when the plate spring member 20 is assembled with the pin member 40, as shown in FIG. 4A and FIG. 5A. Therefore, the plate spring member 20 is prevented from being shifted or disassembled with respect to the pin member 40.

Further, since the drop-off prevention protrusion 51 is positioned nearer to the distal end side than the abutting portion 29 when the abutting portion 29 abuts against the diameter-reduced portion 47, the plate spring member 20 is securely prevented from dropping-off from the pin member 40.

After the plate spring member 20 is assembled with the pin member 40, the mounting-subject member 5 and the mount-base member 1 are superimposed so that the mounting hole 7 and the mounting hole 3 are aligned (see FIGS. 4A and 4B). In the clip 10, when the abutting portions 29 abut against the diameter-reduced portion 47, the leg portion 21 is retained closed without expanding in the diameter, thereby allowing the leg portion 21 to be inserted into the mounting holes 3, 7. In this state, a distal end of the clip 10 is inserted into the mounting hole 7 and the mounting hole 3 so that the flange portions 22 abut against the front side circumference of the mounting hole 7 and so that the leg portion 21 and the shaft portion 41 protrude through the back side circumference of the mounting hole 3.

In this embodiment, since the distal end side (for example, the narrow portion 25a of the inclined portion 25) of the leg portion 21 is formed narrowly, when the leg portion 21 passes through the mounting holes 3, 7, a slide contacting area between the leg portion 21 and the hole inner circumference is made small, and insertion resistance is reduced, thereby allowing the leg portion 21 to be inserted into the mounting holes 3, 7 smoothly.

Further, the tapered surfaces 55a of the guide protrusions 55 are gradually reduced in diameter toward the distal end. Since the tapered surface 55a serves as a guide, the clip 10 is prevented from being caught in the inner circumference of the mounting holes 3, 7 when being inserted thereinto, thereby improving insertionability.

In a state where the flange portions 22 of the plate spring member 20 abut against the front side circumference of the mounting hole 7 as shown in FIGS. 4A and 4B, the shaft portion 41 of the pin member 40 is further pushed.

Then, the tapered portion 45a of the diameter-expanded portion 45 presses the abutting portions 29 from inward to expand the leg portion 21 gradually. Through the tapered portion 45a, the leg portion 21 is further expanded by the diameter-expanded portion 45. Finally, the shaft portion 41 is pushed in until the head portion 43 abuts against the flange portions 22, and the engagement portions 33 are engaged with the back side circumference of the mounting hole 3 (see FIG. 5B). As a result, the clip 10 is fixed with the mounting hole 3.

As described above, the flange portions 22 abut against the front side circumference of the mounting hole 7, while the engagement portions 33 are engaged with the back side circumference of the mounting hole 3. As a result, the mount-base member 1 and the mounting-subject member 5 are sandwiched within the clip 10, and the mounting-subject member 5 is assembled with the mount-base member 1.

In this clip 10, when the shaft portion 41 is further pushed from a state where the flange portions 22 abut against the front side circumference of the mounting hole 7, the diameter-expanded portion 45 abuts against the abutting portions 29 to expand the leg portion 21 and to thereby cause the engagement portions 33 to engage with the back side circumference of the mounting hole 3. As shown in FIG. 5B, when the V-shaped leg portion 21 is expanded, the distal end of the inclined portion 25 from which the engagement portion 33 extends is outwardly moved. Since the distal end of the inclined portion 25 is outwardly moved, an expanding amount of the engagement portion 33 is effectively increased. As a result, even when a thickness of the mount-base member 1 is thin, the engagement portion 33 is surely engaged with the mounting hole 3, thereby tightly fixing the clip 10 without backlash.

As described above, the leg portion 21 of the plate spring member 20 is bent into the V-shape so as to hold the shaft portion 41 of the pin member 40, and the plate spring member 20 is retained with the pin member 40. As a result, there is no need to provide a plate spring member fitting-in slit at the pin member (synthetic resin base) as in JP-3120355-B, or provide a pin member inserting through-hole at the plate spring member (clip) as in JP-3120356-B, thereby simplifying the structures of the plate spring member 20 and the pin member 40.

In this embodiment, since the engagement portion 33 is formed via the slit 31 to be flexible and deformable, a thickness variation in the mounting-subject member and the mount-base member can be effectively absorbed.

The slit 31 is formed into a U-shape to define the tongue piece, and the engagement portion 33 is formed by outwardly raising the tongue piece. Since the engagement portion 33 is formed as a so-called cut-raised piece, the engagement portion 33 having flexibility and deformability is easily formed.

The leg portion 21 is formed widely at the flange portion 21 side as the wide portion 25b, and the engagement portion 33 is provided at the wide portion 25b. As a result, the width of the engagement portion 33 to be engaged with the back side circumference of the mounting hole 3 can be also made wide, thereby increasing an elastic force of the engagement portion 33 and allowing for stronger fixing.

The concave portion 49 is formed at the diameter-expanded portion 45 of the pin member 40 to allow an inward deformation of the engagement portion 33 of the plate spring member 20 (see FIG. 5B). Therefore, the engagement portion 33 is allowed to be largely deformed inward.

The guide protrusions 55 are formed at the distal end of the shaft portion 41 of the pin member 40 so that the bent portion 24 of the plate spring member 20 are entered therebetween in a state where the diameter-expanded portion 45 abuts against the abutting portions 29 (see FIG. 5A). Therefore, when the pin member 40 is pushed in, lateral displacements of the plate spring member 20 is reliably prevented.

FIG. 6 and FIGS. 7A and 7B show a clip according to another embodiment. The substantially same portions as the above-described embodiment are denoted by the same reference numerals, and their description will be omitted.

As shown in FIG. 6 and FIGS. 7A and 7B, a clip in this embodiment is different in structure of the engagement portion from the above-described embodiment.

In this embodiment, in the leg portion 21 of a plate spring member 20a, a pair of parallel slits 32 are formed to extend in the longitudinal direction of the plate spring member 20a along the shoulder portion 27 and the abutting portion 29 (see FIG. 7A). The slits 32 define a strip piece having one end coupled to the width-direction center of the wide portion 25b and the other end coupled to the width-direction center of the abutting portion 29. By outwardly raising the strip piece, an engagement portion 34 is formed so as to be flexible. As shown in FIG. 7B, the engagement portion 34 has a mountain-like shape in which a bent corner is outwardly oriented.

In the clip of another embodiment, both end portions of the engagement portion 34 formed as the strip piece are coupled to the leg portion 21. As a result, an elastic force of the engagement portion 34 can be enhanced, and even if the engagement portion 34 is engaged with the back side circumference of the mounting hole 3 for long time, the engagement portion 34 does not easily wear out and maintains the elastic force.

What is claimed is:

1. A clip comprising:
    a plate spring member including:
        a leg portion bent in a V-shape; and
        flange portions outwardly extending from both ends of the leg portion; and
    a pin member including:
        a shaft portion formed to be inserted inside the plate spring member; and
        a head portion formed at a proximal end of the shaft portion,
    wherein the leg portion of the plate spring member includes:
        a bent portion;
        inclined portions obliquely outwardly extending from both ends of the bent portion;
        engagement portions inwardly extending from distal ends of the inclined portions; and
        abutting portions to be abutted against the shaft portion of the pin member, the abutting portions being connected between the distal ends of the inclined portions and proximal ends of the flange portions, and
    wherein the shaft portion of the pin member includes:
        a diameter-expanded portion provided at a proximal end side of the pin member adjacent to the head portion; and
        a diameter-reduced portion provided at a distal end side of the pin member as compared with the diameter-expanded portion,
    wherein the leg portion is insertable into a mounting hole formed in a mounting subject, in a state where the plate spring member is assembled with the pin member so that the abutting portions abut against the diameter-reduced portion, and
    wherein, in a state where the flange portions of the plate spring member abut against a front side circumference of the mounting hole, the diameter-expanded portion of the shaft portion is caused to abut against the abutting portions to expand the leg portion in accordance with a further pushing operation of the pin member so that the engagement portions are engaged with a back side circumference of the mounting hole.

2. The clip of claim 1,
    wherein the engagement portion is defined via a slit and formed so as to be flexible.

3. The clip of claim 2,
    wherein a U-shaped slit having a pair of slits extending in a longitudinal direction of the plate spring member and a slit joining ends of the pair of slits at a side of the flange portion is formed as the slit to define a tongue piece, and
    wherein the engagement portion is formed by outwardly raising the tongue piece.

4. The clip of claim 2,
    wherein a pair of slits extending in a longitudinal direction of the plate spring member is formed as the slit to define a strip piece, and
    wherein the engagement portion is formed by outwardly raising the strip piece.

5. The clip of claim 1,
    wherein the leg portion is formed narrowly at a side of the bent portion and formed widely at a side of the flange portions, and
    wherein the engagement portions are formed at portions of the leg portion formed widely.

6. The clip of claim 1,
    wherein concave portions are formed on the diameter-expanded portion of the pin member so as to allow the engagement portions of the plate spring member to inwardly deform.

7. The clip of claim 1,
    wherein pressing ribs are formed at the shaft portion of the pin member so that the pressing ribs are positioned at both sides of the leg portion of the plate spring member when the plate spring member is assembled with the pin member.

8. The clip of claim 1,
    wherein a drop-off prevention protrusion is formed at the diameter-reduced portion of the shaft portion so that the drop-off prevention protrusion of the pin member is positioned at the distal end side as compared with the abutting portions of the plate spring member when the abutting portions abut against the diameter-reduced portion.

9. The clip of claim 8, wherein the drop-off prevention protrusion extends outwardly towards the inclined portions and the engagement portions.

10. The clip of claim 1,
    wherein guide protrusions are formed at a distal end of the shaft portion so that the bent portion is entered therebetween when the diameter-expanded portion of the pin member is caused to abut against the abutting portions of the plate spring member, and
    wherein outer-side surfaces of the guide protrusions are tapered to be gradually reduced in diameter toward the distal end side.

11. The clip of claim 1, wherein the bent portion connects the inclined portions.

12. The clip of claim 1, wherein the bent portion, the inclined portions, and the engagement portions are contiguously formed.

13. The clip of claim 1, wherein the inclined portions and the engagement portions are formed on a same member of the leg portion.

14. The clip of claim 1, wherein the bent portion and the inclined portions are contiguously formed.

15. The clip of claim 1, wherein the diameter-expanded portion extends outwardly towards the inclined portions and the engagement portions.

16. The clip of claim 1, wherein an inclined portion of the inclined portions and an engagement portion of the engagement portions are formed on a same side of the leg portion.

* * * * *